(12) United States Patent
Russell

(10) Patent No.: US 7,492,480 B2
(45) Date of Patent: Feb. 17, 2009

(54) SYSTEM FOR HALFTONE SCREEN PRODUCTION

(75) Inventor: Gary Russell, Cincinnati, OH (US)

(73) Assignee: Phototype Engraving Company, Cincinnati, OH (US)

( * ) Notice: Subject to any disclaimer, the term of this patent is extended or adjusted under 35 U.S.C. 154(b) by 428 days.

(21) Appl. No.: 09/939,932

(22) Filed: Aug. 27, 2001

(65) Prior Publication Data

US 2003/0048477 A1 Mar. 13, 2003

(51) Int. Cl.
*G06K 15/00* (2006.01)
*H04N 1/405* (2006.01)

(52) U.S. Cl. .................... 358/3.09; 358/3.06; 358/3.11; 358/3.12

(58) Field of Classification Search ................ 358/1.9, 358/3.02, 3.09, 3.06, 3.11, 3.12, 3.2, 3.16
See application file for complete search history.

(56) References Cited

U.S. PATENT DOCUMENTS

| | | | | |
|---|---|---|---|---|
| 3,688,033 A | | 8/1972 | Hell et al. ...................... 178/15 |
| 4,081,828 A | | 3/1978 | Jones et al. .................... 358/75 |
| 4,196,451 A | * | 4/1980 | Pellar ........................ 358/534 |
| 4,635,131 A | | 1/1987 | Terada et al. ................. 358/296 |
| 4,677,493 A | * | 6/1987 | Shinya ....................... 358/3.27 |
| 5,055,923 A | | 10/1991 | Kitagawa et al. .............. 358/75 |
| 5,087,981 A | * | 2/1992 | Ng et al. ..................... 358/3.05 |
| 5,105,280 A | | 4/1992 | Ogino et al. ................. 358/298 |
| 5,239,391 A | | 8/1993 | Hamilton .................... 358/459 |
| 5,253,084 A | | 10/1993 | Rylander ..................... 358/465 |
| 5,264,926 A | | 11/1993 | Rylander ..................... 358/500 |
| 5,278,671 A | * | 1/1994 | Takahashi et al. ........... 358/3.03 |
| 5,323,245 A | | 6/1994 | Rylander ..................... 358/536 |
| 5,379,118 A | | 1/1995 | Steinhardt et al. ........... 358/298 |
| 5,455,682 A | | 10/1995 | Ikuta .......................... 358/298 |
| 5,583,660 A | | 12/1996 | Rylander ..................... 358/456 |
| 5,627,919 A | * | 5/1997 | Kemmochi ................. 382/254 |
| 5,631,748 A | * | 5/1997 | Harrington ................. 358/502 |
| 5,642,436 A | | 6/1997 | Kerz .......................... 382/237 |
| 5,648,801 A | | 7/1997 | Beardsley et al. ............. 347/15 |
| 5,696,604 A | * | 12/1997 | Curry ........................ 358/3.02 |
| 5,729,632 A | * | 3/1998 | Tai ............................ 382/237 |
| 5,748,330 A | * | 5/1998 | Wang et al. ................. 358/3.21 |
| 5,828,463 A | * | 10/1998 | Delabastita ................. 358/3.17 |
| 5,892,588 A | * | 4/1999 | Samworth .................. 358/3.19 |
| 5,946,455 A | * | 8/1999 | Tresser et al. ................ 358/1.9 |
| 5,982,989 A | * | 11/1999 | Broddin et al. .............. 358/1.9 |
| 6,198,545 B1 | | 3/2001 | Ostromoukhov et al. .... 358/459 |
| 6,213,018 B1 | | 4/2001 | Samworth ................... 101/395 |
| 6,492,095 B2 | | 12/2002 | Samworth ................... 430/306 |
| 6,535,307 B1 | * | 3/2003 | Allen et al. ................. 358/504 |
| 6,975,431 B1 | * | 12/2005 | Sugizaki .................... 358/3.06 |
| 2002/0051213 A1 | * | 5/2002 | Yoshiaki .................... 358/296 |
| 2003/0038974 A1 | * | 2/2003 | Hu ............................ 358/3.06 |

FOREIGN PATENT DOCUMENTS

| | | |
|---|---|---|
| EP | 0454276 A | 10/1991 |
| EP | 0588566 A | 8/1993 |
| EP | 0740457 A | 10/1996 |

* cited by examiner

*Primary Examiner*—Edward L Coles
*Assistant Examiner*—James A. Thompson
(74) *Attorney, Agent, or Firm*—Wood, Herron & Evans, LLP

(57) ABSTRACT

Method, apparatus and program product generates a threshold array that contains at least one halftone cell having overlapping or dissimilar dots.

67 Claims, 4 Drawing Sheets

SYSTEM FOR HALFTONE SCREEN PRODUCTION

FIELD OF THE INVENTION

The present invention relates to the printed reproduction of images, and more particularly, to the automatic generation of continuous tone images using halftone screens.

BACKGROUND OF THE INVENTION

Bi-level printing technologies reproduce images by placing a series of marks or spots along selected points of a printing substrate. Such binary techniques may arrange spots to create dithered, gray scales. Manufacturers typically produce such gray scales using halftone screens. A halftone screen refers to a pattern of dots configured to create an image of varying tones and/or colors. The dots are spaced sufficiently-close such that an unaided human eye cannot distinguish between them. As such, the pattern will convey an overall impression of the desired image.

Dots are conventionally formed according to a threshold algorithm or spot function. More particularly, an algorithm executed by a raster image processor (RIP) may process "x" and "y" pixel coordinates to compare a local image value to a calculated threshold gray value. The results of the evaluation determine whether an image setter will assign a black spot to an addressable point that corresponds to the coordinates. In this manner, the algorithm may group points to form a dot pattern that makes up a screen.

Most screen making systems generate dots using PostScript processes. PostScript is an accepted industry standard description language capable of integrating text, line art and image data into a single document. The RIP may execute a PostScript spot function to generate an array of dot structures comprising threshold gray tones. The array may contain a continuous range of gray values from black to white. Conventional halftone algorithms may produce dot shapes within logically-constructed halftone cells.

A half-tone cell may comprise a square array of addressable, discrete points. The points are addressable via "x" and "y" coordinates of the cell. The coordinates may be scaled so that the cell extends from −1 to +1 in both the "x" and "y" directions. Of note, an operator may input dot pitch and angle requirements into the RIP. As such, the RIP may manipulate the orientation and spacing of halftone cells, while ensuring that each cell seamlessly tiles with neighboring cells at all four sides.

A dot pattern comprising the image may be output to film for conversion into a printing plate. Flexography is one printing process that utilizes such plates made from halftone techniques. Flexography is typically used for printing on paper, corrugated paperboard, and plastic materials. Flexography may utilize a photopolymer plate having projections and other contours that correspond to a halftone screen pattern. The plate may transfer ink onto a substrate using a simple stamping application. Specific examples of items printed with flexography may include: newspapers, milk cartons, frozen food and bread bags, as well as bottle labels.

Despite its wide application and versatility, plate printing processes, which include flexography, may remain prone to splotching and other undesirable ink distributions. In many instances, unsuccessful ink transfers are attributable to the texture of the print plate. Designers often struggle within the confines of restrictive PostScript code to create halftone screen configurations optimized for ink transfer. Other programming rules associated with RIP code may further constrain screen and halftone cell design options.

For instance, PostScript requires that each halftone cell align, or tile, on all sides with neighboring cells. Other programming constraints may limit the number of addressable points contained by a cell, and may prevent switching an activated pixel point from "on" to "off." Such rules may limit the ability of screen designers to create optimized dot shapes that may be automatically generated by a RIP. Designer attempts to manipulate code sometimes fail to produce a threshold array configured for a continuous tonal range, or result in unacceptable gaps between cells. Consequently, what is needed is a new spot function configured to create dot structures that are optimized for conventional printing processes.

SUMMARY OF THE INVENTION

This invention is directed to a method and printing apparatus optimized for ink conveyance. A RIP may process a spot function consistent with the preferred embodiment. The spot function can automatically generate an array of threshold values that correspond to at least one cell having overlapping and/or dissimilar dot structures. The new dots ultimately translate into a superior plate-printing surface.

More particularly, program code of the preferred embodiment arranges dots within a single cell in such a manner as a portion of a first dot overlaps a portion of another. As such, overlapping dots may mask or augment the shape of an underlying dot to create new shapes and patterns. For instance, where an application calls for an overlaying dot to remain "off," or white, the underlying dot may appear to have a cut-out portion that corresponds to the overlain "masking" dot. Similar patterns can be optimized for both ink transfer, smooth tonal transitions, as well as for other optical phenomena.

A variation further enables dots of varying size and shape to occupy the same cell. Also the system may task the spot function to produce a halftone screen that integrates aspects of both conventional coarse and fine halftone screens. For instance, a single halftone cell of such a screen may include dots of both 120 and 360 lines per inch frequencies. The fine dot patterns may prevail in the shadows of a gray scale, while coarse dots are prominent in the highlights. The mid-tone shades may feature unique aspects of both frequencies. As discussed above, the embodiment may orchestrate this integration at the halftone cell level by enabling two or more dots within the same cell to overlap.

The system employs a "fold function" configured to create multiple dot structures within a single cell. The fold function may mathematically subdivide a conventional halftone cell into smaller cells that can accommodate other dots. As such, the algorithm achieves addressability of multiple dots within a single cell, while still operating within the confines of a PostScript program. While all such dots remain centered on addressable raster grid points, the spot function permits dots to conceptually overlap one another. Significantly, the versatility borne of the spot function allows different dot shapes to occupy a single, conventional halftone cell.

By virtue of conforming to conventional PostScript code, the system can capitalize on RIP features such as angle and dot specifications, such as angle and pitch. Such RIP manipulations allow for the further creation and modification of unique dot structures. Significantly, RIP processes use the spot function to create an array that possesses a continuous range of tonal values. More particularly, the spot function enables imperceptible tonal transitions from the highlights to the shadows. The smooth transition technique is attributable, in part, to the integrated mid-tone dot configurations created by the spot function. As discussed below, this integration combines characteristics of both coarse and fine pitch cells. Finally, by manually or automatically specifying dot pitch and rotation angles, the embodiment may execute the spot function to automatically generate an array of unique threshold values.

The above and other objects and advantages of the present invention shall be made apparent from the accompanying drawings and the description thereof.

BRIEF DESCRIPTION OF THE DRAWING

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF SPECIFIC EMBODIMENTS

Figure 1:
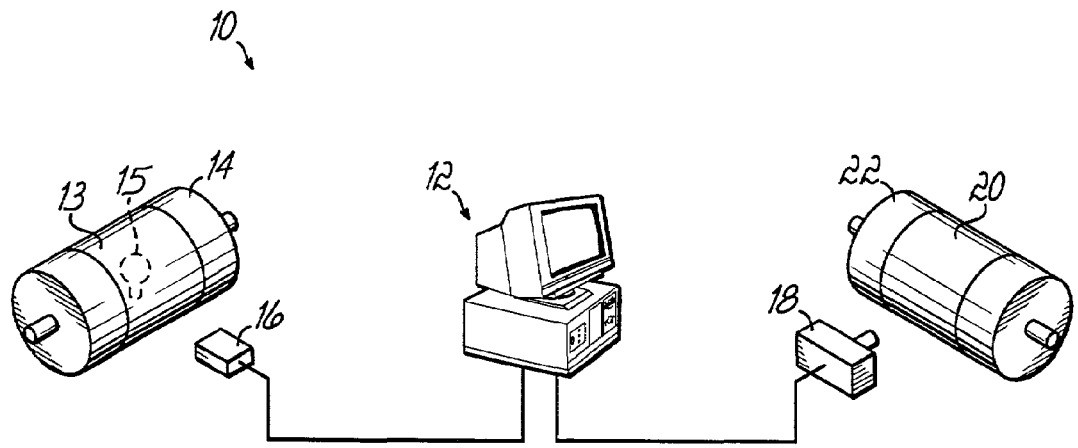
FIG. 1 is a block diagram that illustrates a halftone printing environment that is consistent with the principles of the present invention.

FIG. 1 conceptually illustrates the structure of a halftone screen production apparatus 10 consistent with the principles of the present invention. The apparatus 10 may use a raster image processor (RIP) 2 to manipulate image data scanned from a reading drum 14. A spot function executed by the RIP 12 can produce halftone screens configured to reproduce the image data. Of note, at least one halftone cell of a screen may include overlapping dots. Another, or the same screen, may incorporate two dissimilar dots within a single cell.

Turning more particularly to FIG. 1, an original image 13 mounts onto the reading drum 14. A scanning head 16 successively records a signal embodying the image 13 as the reading drum 14 rotates at a predetermined speed. A light source 15, such as a halogen lamp, mounts within the reading drum 14. The light source 15 may pass light through the image 12 and into the scanning head 16. The system can relate image data recorded by the scanning head 16 to the RIP 12 in the form of raster and resolution independent vector path files. Of note, such files may quantize the image 12 digitally into discrete gray levels, and spatially into image pixels. As discussed below, the image pixels may not share any fixed relationship to halftone cells or a grid of an image setting device 18.

As may be appreciated by one skilled in the art, such image data may be derived from any apparatus suited to optically scan and convert a continuous tone image into digital signals representative of a tonal densities. The RIP 12, which may embody a computing machine, processes the files before outputting a binary, dithered file to the image setter 18. An electronic gun of the image setter 18 may expose or sensitize portions of a recording medium 20. The recording medium 20, which may include photosensitive paper, film or plates, mounts onto a rotatable recording drum 22. Of note, known software and hardware mechanisms may synchronize the rotation of the reading and recording drums 14, 22. A developer may process the recording medium 20 to create halftone screens.

The RIP 12 may use a single, square, halftone cell as a basis for generating a halftone screen. Halftone cells produced within such a screen conventionally contain a dot structure comprised of multiple spots. Program code may process cell coordinates to identify and initiate the placement of a spot at an addressable image setter point. Prior to screen production, a manufacturer may input resolution, angle and pitch requirements into a RIP. Angle requirements may be specified to reduce undesirable optical phenomena, such as low frequency moire patterns. Pitch specifications regard the number of dots per linear inch. The RIP 12 may process these requirements along with a spot function selected by the operator. Namely, the RIP 12 may use the specified frequency and angle, along with trigonometry and the Pythagorean theorem, to determine a set of ideal coordinates for corners of a spot function halftone cell.

While coordinates of some cells may correspond directly to addressable points of an image setter, others may not. In such instances, PostScript code requires that a cell corner coincides with the corner of an image setter pixel. Where alignment is necessary, the RIP 12 may adjust pitch and angles to "snap" the cell coordinates to a nearest pixel corner. Snapping may involve rounding the "x" and "y" coordinates of a halftone cell's lower-right corner to nearest integer values.

The RIP 12 may then retrieve and process a Postscript algorithm, or spot function, to generate a threshold array. The spot function of one embodiment may mathematically define a dot structure within a halftone cell for a given set of coordinates. The RIP 12 can automatically populate halftone cells of a threshold array by imputing threshold values derived from the spot function. Namely, the RIP 12 may feed coordinates into the spot function, which can calculate a threshold value according to the input location. For instance, the function may output a decimal value from zero to one.

As is known in the art, the RIP 12 may use the spot function to order and assign threshold values to cells within the array. The RIP may categorize stored threshold values in such a manner as they are readily associated with the set of coordinates from which they were derived. As such, the threshold array embodies a matrix of multiple halftone cells in the form of threshold values. In this manner, threshold values form a coordinate-specific template for a halftone cell pattern.

As such, the embodiment may configure the array of threshold values to evaluate digitized image pixels. The coded pattern may correspond to underlying halftone cell configurations. As discussed above, grouping multiple halftone cells within an array allows the RIP 12 to uniformly manipulate the dot angle and pitch of all cells to preserve boundaries and tile alignment.

The RIP 12 may then store the generated array in a halftone screen cache. In this manner, the RIP 12 can recall a repetitive array without re-performing calculations. The RIP 12 ultimately uses the threshold array to compare threshold values with underlying image data. If the tonal value of the image should exceed the threshold value at an addressable image setter point, then program code may generate a spot at that location.

A RIP 12 may employ a comparator to determine whether the image setter should mark a particular point or leave it blank. Comparators conventionally rely on threshold values as a reference for determining whether a mark will be activated at an addressable point. The comparator may evaluate a threshold value against a corresponding image value to direct the bi-level printer.

It may be helpful to conceptualize the comparison process by imagining that the RIP overlays the image pixel over the threshold grid. As such, the overlapping values may be compared according to common coordinates. Where an image value exceeds the overlain threshold value, the image setter may place a spot. Of note, where an image pixel value corresponds to an area larger than that of an underlying threshold value, multiple threshold values may each operate using the single pixel image value. In either case, the RIP 12 may transmit a dithered, binary file to the image setter 18 for producing a corresponding halftone screen.

Figure 2:
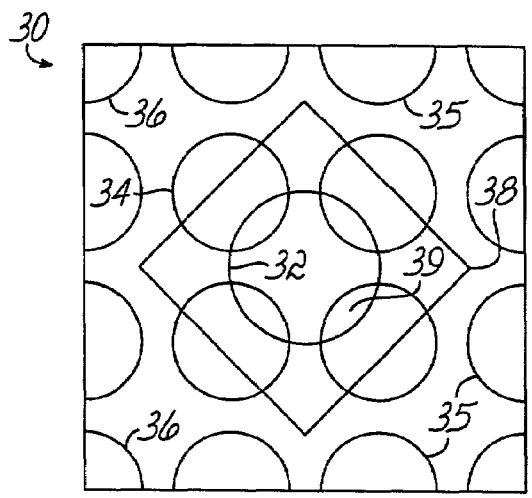
FIG. 2 illustrates a preferred halftone cell design that may be produced by the printing system of FIG. 1.
Figure 4A:
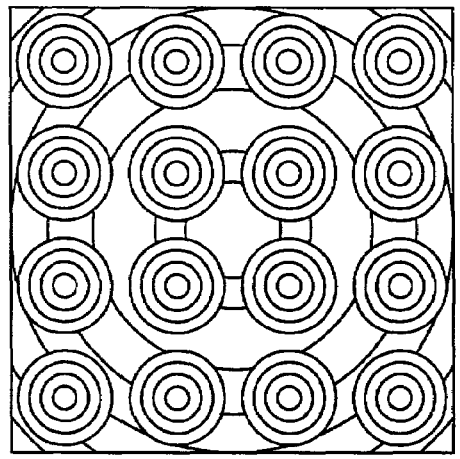
FIGS. 4a-h illustrate additional, exemplary halftone cell configurations and patterns that may be generated by the printing system of FIG. 1.
Figure 4C:
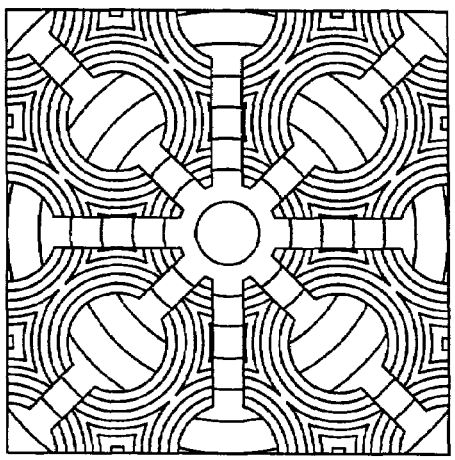
Figure 4E:
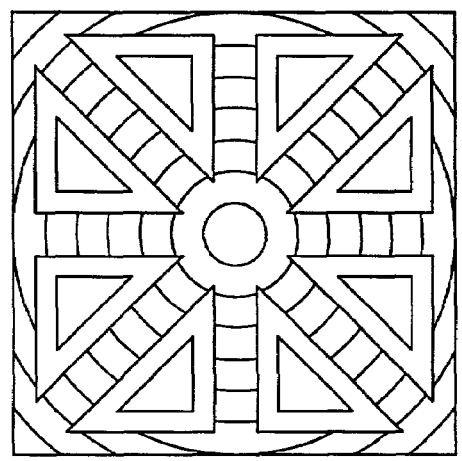
Figure 4G:
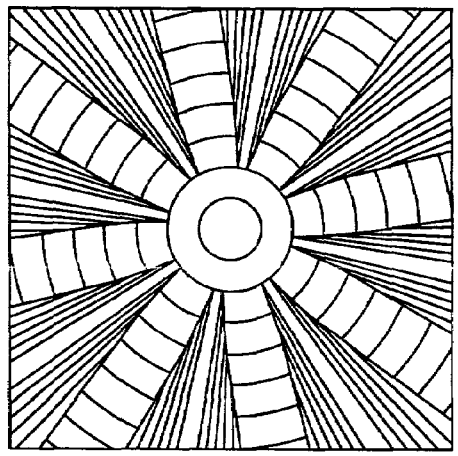

FIG. 2 illustrates a halftone cell 30 that can be produced in accordance within the printing environment of FIG. 1. At its center, the cell 30 contains a large circle 32. The inclusion and placement of such a large circle 32 may be analogous to conventional halftone cell arrangements. Within the context of such known cells, the large circle 32 may correspond to a coarse tonal pitch.

As may be evident from FIG. 2, the exemplary cell 30 of FIG. 2 additionally supports 16 whole or partial small circles 34, 35, 36. The small circles 34, 35, 36 constitute different dot shapes than that of the large circle 32. More particularly, the small dots 34, 35, 36 exhibit larger pitch characteristics than the large circle 32. Likewise, a diamond 38 dot within the cell represents a structural departure from all other dots in the cell. In this manner, the embodiment allows for dissimilar dots within a single cell. Of note, the small circles may correspond to fine pitch dots of a conventional tonal array. In this manner, a single halftone cell may support dual pitch dots within a cell. Benefits of such an application may ultimately translate into greater surface texture on a printing plate. Such texture may allow for greater ink transfer onto a substrate.

As shown in FIG. 2, four of the small circles 34 overlap portions 39 of the large circle 32. As such, the spot function may manipulate the raster points of the overlapping dots 34 to create an integrated dot shape. For instance, the spot function can call for the points comprising the small circles 34 to be "off" at select coordinates. As such, the underlying large circle 32 may appear to have cut-outs corresponding to the overlapped portions 39. The resultant integrated shape may appear to form a "cross" shape. The threshold array of FIG. 3 demonstrates such a shape in its mid-tones 42. Of note, the cross shape embodies an integration of both fine and coarse dot characteristics. Such gradual and stepped integration allows for imperceptible tonal changes. That is, the spot function can produce dot patterns that exhibit smooth, uninterrupted tonal evolutions from highlights to shadows.

As discussed below in greater detail, the relative size or pitch of the respective dots may change throughout an array. Dot transformations may be driven by the spot algorithm as it processes image pixel coordinates. For example, the pitch of overlapping small circles 34 may diminish in the shadows of an array, masking less of the underlying large circle 32. Another feature of the embodiment may call for certain dots to be invisible at specified thresholds. For instance, one embodiment may call for the diamond 38 dot to be "off" in the highlights, but predominate in the shadows.

While one embodiment may call for the different dots of a cell 30 to be of uniform color, such as black, another may specify that particular dots convey different colors. Of note, the embodiment can further align partial dots of a first cell with a corresponding partial dots of an adjacent cell. For instance, the threshold equation may align a partial small circle 35 with a matching half in an adjacent cell. As such, the embodiment may preserve and continue a halftone pattern from one cell to the next without a perceptible break.

Figure 3:
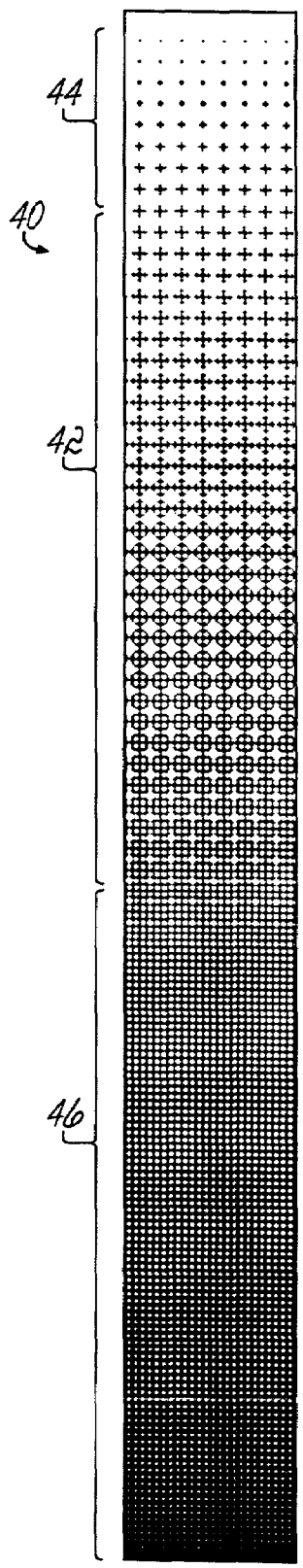
FIG. 3 shows a dot pattern generated using the halftone cell design of FIG. 2.
Figure 4B:
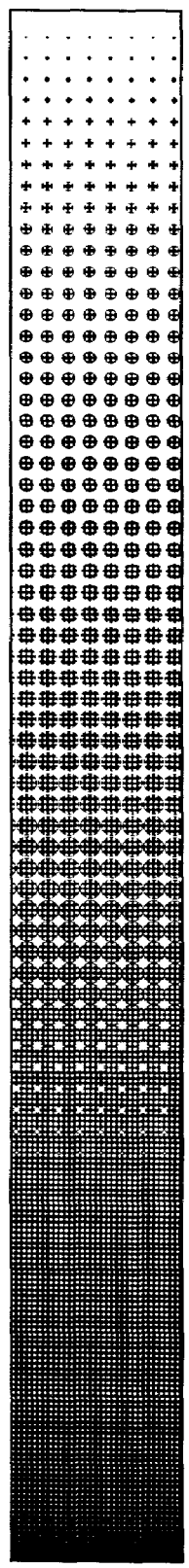
Figure 4D:
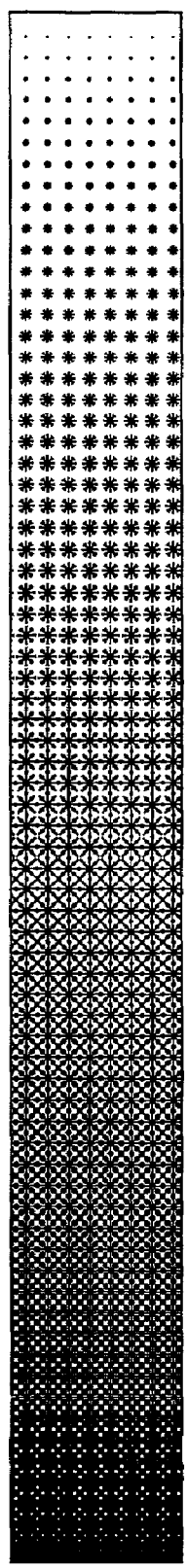
Figure 4F:
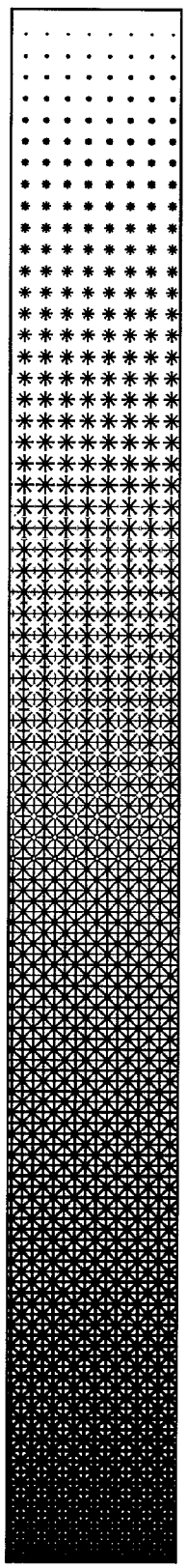
Figure 4H:
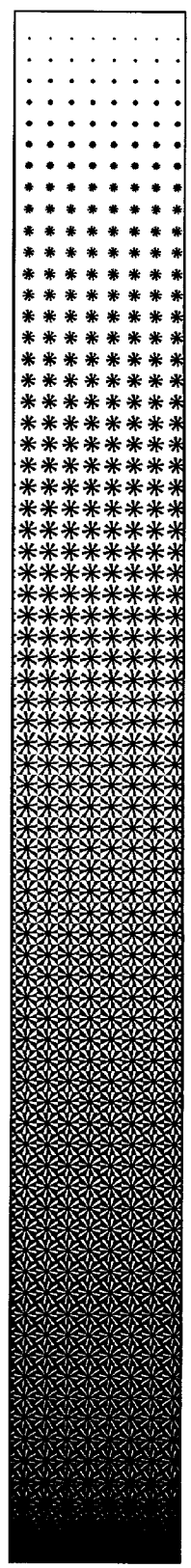

FIG. 3 shows a dot pattern 40 generated using the halftone cell design of FIG. 2. The illustrated embodiment integrates features of a coarse halftone screen with a fine screen. More specifically, the pattern 40 may combine 120 and 360 line frequencies. As may be apparent from the magnified pattern 40 of FIG. 3, the coarse region begins near the top of the scale, or highlights 44, and may correspond to lighter shades of the original image. Conversely, the fine pitch region produced by the spot function aligns with the bottom portion, or shadows 46, of the illustrated gray scale pattern 40.

When printed to scale, the fine pitch may appear uniformly dark. The embodiment may capitalize on optical phenomena that makes a dithered, printed region appear solid to an observer. The mid-tone region 42 of FIG. 3 may demonstrate one of the most versatile and commercially viable features of the embodiment. That is, the dot shapes developed in transitioning from the coarse to fine pitch portions may exhibit unique characteristics of both. In this manner, the embodiment integrates pitch characteristics to provide a smooth, imperceptible transition from the highlights 44 to the shadows 46. As such, the threshold array of the embodiment can produce a plate that not only has a superior texture for transferring ink, but also does so in a manner that avoids abrupt changes in tonal density.

FIGS. 4a-h speak to the wide application of other embodiments consistent with the present invention. As above, a spot function allows for the automatic generation of halftone cells 4a, 4c, 4e, 4g that support overlapping and/or dissimilar dots within a single cell. Corresponding dot patterns 4b, 4d, 4f, 4h demonstrate optimized dot structures that exhibit smooth transitions between tonal extremes.

The spot function processed by the RIP to produce the halftone cell and pattern of FIGS. 2 and 3 may be defined in PostScript as follows:

```
/th {.5} def
/fold {abs 1 3 div sub abs 1 3 div sub abs 1 3 div sub abs 3 mul} bind def
/round {x dup mul y dup mul add 2 div .5 exp 1 exch sub} bind def
/circles {x fold dup mul y fold dup mul add 2 div .5 exp} bind def
/diamond {1 x abs .9 y abs mul add 2 div sub} bind def
/spot function
    {
    /y exch def
    /x exch def
    round .75 gt
        {circles th gt
            {round 3 div 2 3 div add
            }
            {circles 3 div
            } ifelse
        }
        {circles th gt
            {diamond 3 div 1 3 div add
            }
            {circles 3 div
            } if else
    } bind def
```

As discussed herein, the RIP may execute the above code to generate unique halftone cells and patterns. Such cells and patterns may include overlapping and/or dissimilar dots contained within a single cell. This encoded feature may enable designers to produce threshold arrays that translate into smooth tonal transitions and superior ink transfer.

Figure 5:
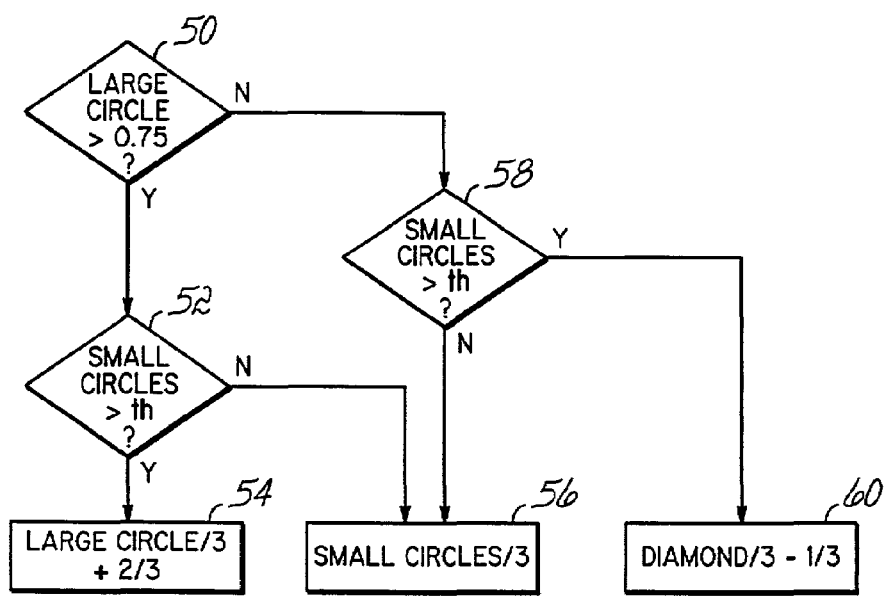
FIG. 5 shows a flowchart that steps out processes of an exemplary spot function configured to produce the halftone image of FIG. 2.

The flowchart of FIG. 5 may emulate the operation of the above PostScript as executed by a RIP. The flowchart illustrates execution of the exemplary spot function for a given raster point. The algorithm, embodied in the flowchart, can output a threshold value used by the embodiment to determine whether a spot is aenerated at that point.

To generate a threshold value using the spot function, the RIP may apply a set of coordinates to the algorithm. The coordinates may correspond to a place holder of the threshold array, as well as to an addressable point of the image setter. The coordinates, themselves, can consist of a vertical, $y_j$, and a horizon, $x_i$, value between negative and positive one. As discussed above, the mathematical boundaries of a halftone cell may dictate this range. Of note, "i" and "j" may correspond to the number, "n," of addressable points in the vertical and horizontal planes.

The spot function specifies which dot shapes will be created within a halftone cell. For instance, the spot function responsible for generating the halftone cell of FIG. 2 may incorporate three dissimilar shapes. As discussed above, the exemplary shapes of the illustrated cell include large and small circles, as well as diamonds. One skilled in the art will appreciate that the embodiment may alternatively generate any known dot shape conventionally used in halftone printing. As such, the spot function may specify the boundaries of the respective dots relative to their position within the halftone cell. For instance, the function may define the large circle of the cell as:

$$\text{large circle}_{i,j} = 1 - (x_i^2 + y_j^2/2)^{0.5}.$$

Likewise, the function may provide for a diamond shape with boundaries determined by:

$$\text{diamond}_{i,j} = 1 - (|x_i| - 0.9 * |y_j|)/2.$$

A "fold" function of the spot function, as discussed above, causes the RIP to configure multiple dot shapes into a single halftone cell. Mathematically, the fold function operates as follows:

$$\text{fold}(x) = ||||x| - \tfrac{1}{3}| - \tfrac{1}{3}| - \tfrac{1}{3}| * 3.$$

The illustrated embodiment of FIG. 2 incorporates the fold function into the algorithm's definition of the small circles:

$$\text{small circles}_{i,j} = [(\text{fold}(x_i)^2 + \text{fold}(y_j)^2)/2]^{0.5}.$$

The fold feature of the above equation allows the spot function to overlap other dots within the cell using the small circles. Namely, the spot function may mask or augment overlapped dots to create new dot shapes and optical phenomena. For instance, one embodiment may call for the spots of the small circles to remain "off," thereby eclipsing, or masking portions of the underlying large circle. The resultant "cross" dot of a preferred embodiment is shown in the mid-tone range 42 of the preferred embodiment illustrated in FIG. 3.

The spot function may use these dot boundary definitions to determine threshold values. The flowchart of FIG. 5 outlines the process steps performed by the RIP in executing the above PostScript algorithm for a particular set of coordinates, (i, j). At block 50, the spot function presents a first condition for the RIP to evaluate. Namely, if the value of the above listed large circle equation is greater than 0.75, then the RIP will evaluate a second condition at block 52. Particularly, the RIP may determine if the value for "small circles" is greater than some threshold constant. Should the condition of block 52 be satisfied, then the spot function may output a threshold value corresponding to the equation of block 54. Of note, the illustrated equation may have the effect of overlaying the small circles 34 of FIG. 2 over the large circle 32.

Should the condition of block 52 remain unsatisfied, then the spot function will alternatively output a threshold value according to block 56. That is, the equation of block 56 will determine the threshold value for the submitted, image setter coordinates. As with other such boundary functions of the spot algorithm, this equation may serve, in part, to confine the size of the threshold value for the overlapping small circles.

Should the condition of block 50 be unsatisfied for a given set of coordinates, the embodiment may again use the coordinate set to calculate a "small circles$_{i,j}$" output. Program code may compare this output to a threshold constant at block 58. This evaluation may determine whether the threshold value is determined according to block 56 or 60. Where the "small circles$_{i,j}$" output is greater than the constant, the threshold value may correspond to a diamond shaped dot. Namely, the embodiment may apply the coordinates to the equation of block 60. Where the algorithm determines at block 58 that the "small circles$_{i,j}$" output is less than the threshold constant, then the threshold value may again be determined from the equation of block 56. As discussed above, the RIP may store the calculated threshold in cache memory to avoid future recalculation.

Of note, the spot function embodied in the flowchart of FIG. 5 integrates aspects of coarse and fine pitch design aspects within the mid-tones. The spot function may enable smooth transitions between highlights and shadows by selectively evolving the pitch of some dots in a cell. The spot function may further secure such transitions, in addition to other optical phenomena, by overlapping specified dots of a cell. As discussed above, the spot function may further introduce and remove dots within the cell as dictated by input coordinates. For instance, the function may generate a diamond shape coincident with block 60 of FIG. 5.

While the present invention has been illustrated by a description of various embodiments and while these embodiments have been described in considerable detail, it is not the intention of the applicants to restrict or in any way limit the scope of the appended claims to such detail. For instance, while a preferred embodiment may have application within flexography, the embodiment is nonetheless compatible with all forms of halftone printing, to include gravure, offset and photolithography. Similarly, while compatible within the confines of PostScript code, the algorithm of the invention is not limited to such applications. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A method for producing a halftone image, said method comprising determining an overlap of at least a portion of a first dot of a halftone cell of a halftone screen with at least a portion of a second dot of said halftone cell of said halftone screen; and overlapping said at least said portion of said first dot with said at least said portion of said second dot throughout said image in a manner that in substantially all halftone cells the narrowest width of any ink-bearing portion of each halftone cell is no greater than approximately 30% of the width of the halftone cell.

2. The method according to claim 1, further comprising differing line frequencies of said first and second dots.

3. The method according to claim 1, further comprising differing shapes of said first and second dots.

4. The method according to claim 3, further comprising selecting said shapes of said first and second dots from a group consisting of: elliptical, triangular, circular, rectangular, diamond and linear shapes.

5. The method according to claim 1, further comprising differing tonal characteristics of said first and second dots.

6. The method according to claim 1, further comprising orienting a first angle of said first dot differently than a second angle of said second dot relative to a first side of said halftone cell.

7. The method of claim 1, wherein said overlapping further comprises creating said halftone image to include dots having different line frequencies.

8. The method of claim 1, wherein producing said halftone image further includes producing at least one of a printing plate, a threshold array and a halftone screen.

9. The method of claim 1, wherein said overlapping further includes generating a cross shape.

10. A method for producing a halftone image, said method comprising placing a first dot of a halftone screen and a second dot of said halftone screen within a halftone cell, wherein said first and second halftone dots are dissimilar and wherein said dots are generated at a threshold value throughout said image in a manner that in substantially all halftone cells the narrowest width of any ink-bearing portion of each halftone cell is no greater than approximately 30% of the width of the halftone cell.

11. The method according to claim 10, further comprising differing line frequencies of said first arid second dots.

12. The method according to claim 10, further comprising differing shapes of said first and second dots.

13. The method according to claim 12, further comprising selecting said shapes of said first and second dots from a group consisting of: elliptical, cross, triangular, circular, rectangular, diamond and linear shapes.

14. The method according to claim 10, further comprising differing tonal characteristics of said first and second dots.

15. The method according to claim 10, further comprising orienting an angle of said first dot differently than a second angle of said second dot relative to a first side of said halftone cell.

16. The method of claim 10, wherein said placing of said first and second dots further comprises creating an array that includes dots having different line frequencies.

17. A printing plate comprising a printing and a non-printing surface, wherein said printing surface is manufactured using a halftone screen having a first and a second dot within a halftone cell of said halftone screen, wherein at least a portion of said first dot is programmatically determined to overlap at least a portion of said second dot throughout said image in a manner that in substantially all halftone cells the narrowest width of any ink-bearing portion of each halftone cell is no greater than approximately 30% of the width of the halftone cell.

18. The printing plate according to claim 17, wherein each of said first and second dots have different shapes.

19. The printing plate according to claim 18, wherein said different shapes are selected from a group consisting of: elliptical, triangular, rectangular, circular, cross, diamond and linear shapes.

20. The printing plate according to claim 17, wherein each of said first and second dots have different tonal characteristics.

21. The printing plate according to claim 17, wherein each of said first and second dots have different line frequencies.

22. The printing plate according to claim 17, wherein said first dot is oriented at a different angle than said second dot relative to a first side of said halftone cell.

23. The printing plate of claim 17, further comprising at least one of a threshold array and a halftone screen, wherein both said array and said screen are associated with said printing plate.

24. A printing plate comprising a printing and a non-printing surface, wherein said printing surface is manufactured using a halftone screen having a first and a second dot within said halftone cell of a halftone screen, wherein said first and second dots are dissimilar and are generated at the same threshold value throughout said image in a manner that in substantially all halftone cells the narrowest width of any ink-bearing portion of each halftone cell is no greater than approximately 30% of the width of the halftone cell.

25. The printing plate according to claim 24, wherein each of said first and second dots has a different line frequency.

26. The printing plate according to claim 24, wherein each of said first and second dots has a different shape.

27. The printing plate according to claim 26, wherein said different shape is selected from a group consisting of: elliptical, triangular, rectangular, circular, diamond and linear shapes.

28. The printing plate according to claim 24, wherein each of said first and second dots has a different tonal characteristic.

29. The printing plate according to claim 24, wherein said first dot is oriented at a different angle than said second dot relative to a first side of said halftone cell.

30. The printing plate of claim 24, further comprising at least one of a threshold array and a halftone screen, wherein both said array and said screen are associated with said printing plate.

31. A processor executing an executable program to
generate a halftone screen comprising a halftone cell derived from a threshold equation, wherein a fold function of said threshold equation generates at least one dot within said halftone cell according to $\text{fold}(x)=||||x|-\frac{1}{3}|-\frac{1}{3}|-\frac{1}{3}|*3$ throughout said image in a manner that in substantially all halftone cells the narrowest width of any ink-bearing portion of each halftone cell is no greater than approximately 30% of the width of the halftone cell and
store said halftone screen a computer readable medium.

32. A program product, comprising:
a computer readable medium bearing a program that is executable by a processor to place a first and a second dot within a halftone cell of a halftone screen, to determine an overlap between at least a portion of said first dot and at least a portion of said second dot, to overlap said at least said portions throughout said image in a manner that in substantially all halftone cells the narrowest width of any ink-bearing portion of each halftone cell is no greater than approximately 30% of the width of the halftone cell.

33. A program product, comprising:
a computer readable medium bearing a program that is executable by a processor to place a first dot generated at a threshold value and a second dot generated at said threshold value within a halftone cell of a halftone screen, wherein said first and second dots are dissimilar in at least one characteristic selected from a group consisting of: shape, frequency, tone and orientation throughout said image in a manner that in substantially all halftone cells the narrowest width of any ink-bearing portion of each halftone cell is no greater than approximately 30% of the width of the halftone cell.

34. A method for producing a halftone image using a program that executes on a processor, comprising creating a printing plate manufactured using a halftone screen including halftone dots generated at a threshold value having different line frequencies throughout said image in a manner that in substantially all halftone cells the narrowest width of any ink-bearing portion of each halftone cell is no greater than approximately 30% of the width of the halftone cell.

35. The method of claim 34, wherein creating said printing plate further comprises integrating fine and coarse frequency dots.

36. The method of claim 35, wherein said integrating said fine and coarse frequency dots further includes generating a mid-tone dot.

37. The method of claim 34, wherein creating said printing plate further comprises overlapping at least a portion of a first dot of a halftone cell of said printing plate with at least a portion of a second dot of said halftone cell.

38. The method of claim 34, wherein creating said printing plate further comprises placing a first and a second dot within a halftone cell of said printing plate, wherein said first and second halftone dots are dissimilar.

39. The method of claim 34, wherein creating said printing plate further comprises creating at least one of a halftone screen and threshold array, both said array and said screen including dots having different frequencies.

40. The method of claim 34, further comprising transitioning between said dots of different frequencies using a dot that includes a third pitch.

41. The method of claim 34, wherein creating said printing plate includes generating at least one of said dots to include a frequency selected from a group consisting of at least one of: a fine pitch, a coarse pitch and an integrated pitch.

42. The method of claim 34, wherein said creating said printing plate further includes generating a cross shape.

43. The method of claim 34, wherein creating said printing plate further includes creating a smooth transition between said dots.

44. A printing system, including:
a scanning circuit for reading image data from a source;
a processor in communication with said scanning circuit, wherein said processor receives and processes the image data to generate an image file;
an image setter in communication with said processor, wherein said image setter receives said image file from said processor and produces a plurality of dots on a halftone screen, said plurality of dots including a plurality of line frequencies at a threshold value throughout said image in a manner that in substantially all halftone cells the narrowest width of any ink-bearing portion of each halftone cell is no greater than approximately 30% of the width of the halftone cell.

45. The printing system of claim 44, further comprising including a smooth transition between said plurality of dots.

46. The printing system of claim 44, wherein said recording medium is selected from a group consisting of: a threshold array, a halftone screen and a printing plate.

47. A printing system, including:
a scanning circuit for reading image data from a source;
a processor in communication with said scanning circuit, wherein said processor receives and processes the image data to generate an image file;
an image setter in communication with said processor, wherein said image setter receives said image file from said processor and produces a plurality of dots on a halftone screen, said plurality of dots including a first and a second dot within a halftone cell of said halftone screen, wherein said image setter determines that at least a portion of said first dot overlaps at least a portion of said second dot throughout said image in a manner that in substantially all halftone cells the narrowest width of any ink-bearing portion of each halftone cell is no greater than approximately 30% of the width of the halftone cell.

48. A printing system, including:
a scanning circuit for reading image data from a source;
a processor in communication with said scanning circuit, wherein said processor receives and processes the image data to generate an image file;
an image setter in communication with said processor, wherein said image setter receives said image file from said processor and produces a plurality of dots on a halftone screen, said plurality of dots including a first and a second dot within a halftone cell of said halftone screen, wherein said first and second dots are dissimilar and generated at a threshold value throughout said image in a manner that in substantially all halftone cells the narrowest width of any ink-bearing portion of each halftone cell is no greater than approximately 30% of the width of the halftone cell.

49. A program product, comprising:
a computer readable medium bearing a computer executable program configured to produce a plurality of dots on a halftone screen, wherein said plurality of dots include multiple line frequencies at a threshold value throughout said image in a manner that in substantially all halftone cells the narrowest width of any ink-bearing portion of each halftone cell is no greater than approximately 30% of the width of the halftone cell.

50. The program product of claim 49, wherein said program is further configured to gradually transition between said multiple line frequencies.

51. A method for producing a halftone image using a program that executes on a processor, comprising creating a threshold array including a gradual transition between highlights and shadows of said threshold array, and wherein said gradual transition includes multiple halftone dots at a threshold value having multiple line frequencies throughout said image in a manner that in substantially all halftone cells the narrowest width of any ink-bearing portion of each halftone cell is no greater than approximately 30% of the width of the halftone cell.

52. The method of claim 51, further comprising programmatically determining to overlap dots of said threshold array.

53. The method of claim 51, further comprising including within said threshold array a plurality of dots at a threshold value that include at least one dissimilar characteristic selected from a group consisting of: line frequency, shape, tone and orientation.

54. The method of claim 51, further comprising using said threshold array to generate a halftone image.

55. A printing plate comprising a printing and a non-printing surface, wherein said printing surface is manufactured using a common halftone screen that includes halftone dots generated at a threshold value, wherein said halftone dots include different line frequencies throughout said image in a manner that in substantially all halftone cells the narrowest width of any ink-bearing portion of each halftone cell is no greater than approximately 30% of the width of the halftone cell.

56. The printing plate of claim 55, wherein said dots include a frequency selected from a group consisting of at least one of: a coarse pitch, a fine pitch and an integrated pitch.

57. The printing plate of claim 55, wherein said halftone screen includes at least a portion of a first dot overlapped with at least a portion of a second dot.

58. The printing plate of claim 55, wherein said halftone screen includes first and second dots, wherein said first and second dots are dissimilar.

59. The printing plate of claim 55, wherein said halftone screen further comprises dots having different line frequencies.

60. The printing plate of claim 55, wherein said halftone screen further includes a gradual transition between said dots having different line frequencies.

61. The printing plate of claim 55, wherein said halftone screen further includes a dot having a third line frequency, wherein said dot having said third line frequency is positioned between said dots having different line frequencies.

62. The printing plate of claim 55, wherein said halftone screen further includes a mid-tone dot positioned between said dots having different line frequencies.

63. The printing plate of claim 55, wherein said halftone screen includes a substantially cross shape.

64. A raster image processor executing a program configured to utilize a threshold array that includes a highlight and a shadow region, wherein said threshold array further includes a gradual transition between said highlight and shadow regions, and wherein said gradual transition comprises multiple halftone dots at a threshold value having multiple line frequencies throughout said image in a manner that in substantially all halftone cells the narrowest width of any ink-bearing portion of each halftone cell is no greater than approximately 30% of the width of the halftone cell; the processor capable of reading a computer readable medium bearing said threshold array.

65. The processor of claim 64, wherein said threshold array further includes overlapped dots.

66. The processor of claim 64, wherein said threshold array further includes a plurality of dots that include at least one dissimilar characteristic selected from a group that consists of: frequency, shape, tone and orientation.

67. A program product, comprising:
a computer readable medium bearing an executable program configured to use a threshold array that includes a highlight and a shadow region, wherein the threshold array further includes a smooth transition between said highlight and said shadow region, and wherein said smooth transition comprises multiple halftone dots at a threshold value having multiple line frequencies throughout said image in a manner that in substantially all halftone cells the narrowest width of any ink-bearing portion of each halftone cell is no greater than approximately 30% of the width of the halftone cell.

* * * * *